(12) United States Patent
Aldahir et al.

(10) Patent No.: US 12,079,302 B2
(45) Date of Patent: Sep. 3, 2024

(54) TURF PLAYABILITY TESTING

(71) Applicant: Columbia Insurance Company, Omaha, NE (US)

(72) Inventors: Philipe Aldahir, Chattanooga, TN (US); Trevor Sands, Kennesaw, GA (US); Jeremy Dutton, Calhoun, GA (US)

(73) Assignee: Columbia Insurance Company, Omaha, NE (US)

( * ) Notice: Subject to any disclaimer, the term of this patent is extended or adjusted under 35 U.S.C. 154(b) by 868 days.

(21) Appl. No.: 16/563,684

(22) Filed: Sep. 6, 2019

(65) Prior Publication Data

US 2020/0081938 A1   Mar. 12, 2020

Related U.S. Application Data

(60) Provisional application No. 62/727,862, filed on Sep. 6, 2018.

(51) Int. Cl.
*G06F 16/00* (2019.01)
*G06F 16/22* (2019.01)
*G06F 16/23* (2019.01)
*G06F 17/17* (2006.01)

(52) U.S. Cl.
CPC ........ *G06F 17/175* (2013.01); *G06F 16/2237* (2019.01); *G06F 16/2379* (2019.01)

(58) Field of Classification Search
CPC ... D10B 2505/202; E01C 13/02; E01C 13/08; E01C 2013/086; G06F 16/2237; G06F 16/2379; G06F 17/175; G06Q 90/00
See application file for complete search history.

(56) References Cited

U.S. PATENT DOCUMENTS

| | | | | |
|---|---|---|---|---|
| 6,421,553 | B1* | 7/2002 | Costa | A61B 5/0068 |
| | | | | 356/302 |
| 8,185,547 | B1* | 5/2012 | Ordonez | G06F 17/16 |
| | | | | 707/705 |
| 8,397,202 | B1 | 3/2013 | Nnaji | |
| 10,916,333 | B1* | 2/2021 | Yeturu | G06N 5/003 |
| 2002/0107858 | A1* | 8/2002 | Lundahl | G06Q 30/02 |
| 2006/0161403 | A1 | 7/2006 | Jiang et al. | |
| 2007/0087154 | A1* | 4/2007 | Bird | E01C 13/045 |
| | | | | 428/44 |
| 2010/0090090 | A1 | 4/2010 | Gross et al. | |
| 2013/0055797 | A1* | 3/2013 | Cline | G01N 3/303 |
| | | | | 73/82 |

(Continued)

FOREIGN PATENT DOCUMENTS

WO   PCT/US2019/050074   9/2019

OTHER PUBLICATIONS

U.S. Appl. No. 62/727,862, filed Sep. 6, 2018, Philipe Aldahir.

(Continued)

*Primary Examiner* — Khanh B Pham
(74) *Attorney, Agent, or Firm* — Ballard Spahr LLP

(57) ABSTRACT

Systems and methods for determining a quantifiable playability of a sports surface are disclosed. Test data is included in a test data matrix. A centroid associated with the test data matrix is determined. Distances of data points to the test data matrix are determined. A playability score is calculated as a function of the determined distances.

20 Claims, 4 Drawing Sheets

(56) References Cited

U.S. PATENT DOCUMENTS

2014/0351259 A1* 11/2014 Bilimoria ................ G06F 16/95
707/740
2015/0032759 A1* 1/2015 Lee ......................... G06F 16/35
707/741
2017/0220603 A1* 8/2017 Riggs .................. G06F 16/2458

OTHER PUBLICATIONS

Gagne et al. "Classification of convective areas using decision trees." In: Journal of Atmospheric and Oceanic Technology. Jul. 2009 (Jul. 2009) Retrieved on Oct. 25, 2019(2019) from <https://journals.ametsoc.org/doi/pdf/10.1175/2008JTECHA1205.1>.

International Search Report and Written Opinion dated Nov. 15, 2019 by the International Searching Authority for International Application No. PCT/US2019/050074, filed on Sep. 6, 2019 (Applicant-Philipe Aldhir) (9 Pages).

European Extended Search Report for EP Application No. 19858474.0 mailed May 3, 2022 (6 pages).

European Office Action for EP Application No. 19858474.0 mailed Oct. 30, 2023 (6 pages).

* cited by examiner

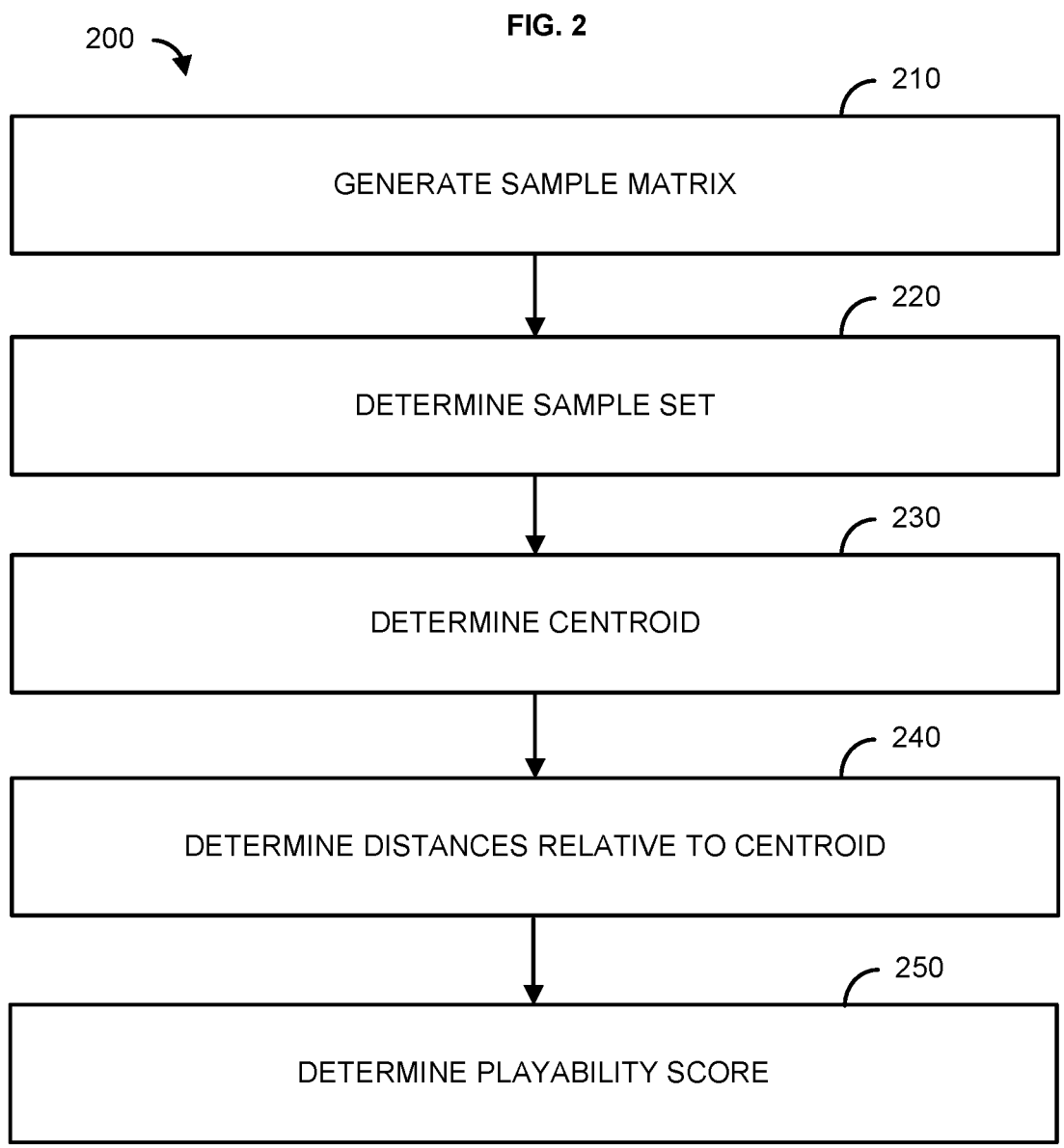

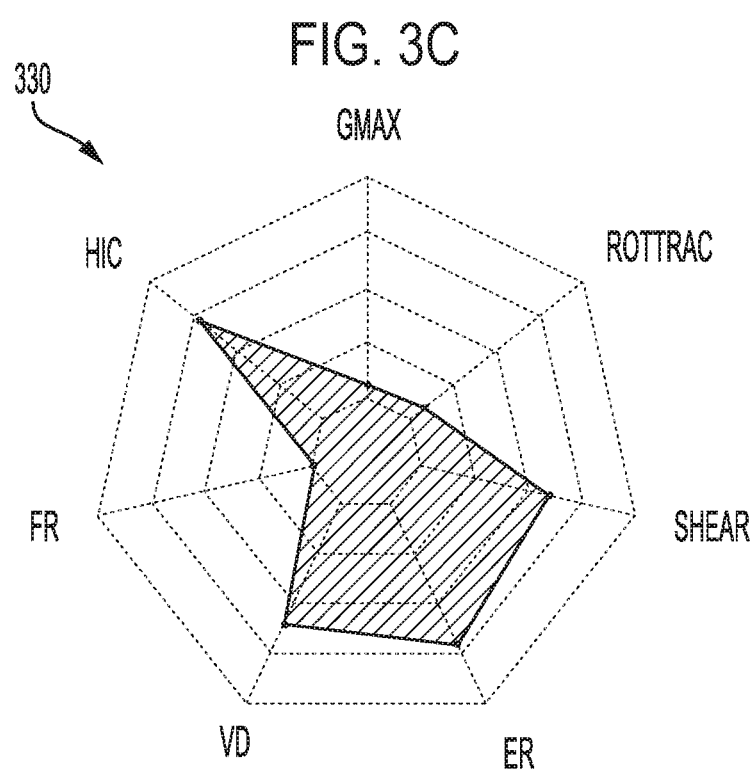

TURF PLAYABILITY TESTING

CROSS REFERENCE TO RELATED PATENT APPLICATION

This application claims priority to U.S. Application No. 62/727,862 filed Sep. 6, 2018 which is herein incorporated by reference in its entirety.

BACKGROUND

Turf playability can be considered as the way participants and objects interact with a particular sports playing surface. Various factors can affect playability. However, playability is typically considered a subjective and non-quantifiable descriptor.

SUMMARY

It is to be understood that both the following general description and the following detailed description are exemplary and explanatory only and are not restrictive. Provided are methods and systems for testing turf playability. A method can comprise generating a test data matrix comprising a first dimension and a second dimension, each first dimension entry in a plurality of first dimension entries corresponding to a respective tested attribute of a plurality of tested attributes, each second dimension entry in a plurality of second dimension entries corresponding to a respective test point of a plurality of test points; determining a centroid associated with the test data matrix; determining a plurality of distances relative to the centroid; and determining, based on a comparison of the plurality of distances to a reference data set, a playability score.

A system can comprise at least one computing device configured to at least: generate a test data matrix comprising a first dimension and a second dimension, each first dimension entry in a plurality of first dimension entries corresponding to a respective tested attribute of a plurality of tested attributes, each second dimension entry in a plurality of second dimension entries corresponding to a respective test point of a plurality of test points; determine a centroid associated with the test data matrix; determine a plurality of distances relative to the centroid; and determine, based on a comparison of the plurality of distances to a reference data set, a playability score.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is a flowchart of an example method;

FIG. 3C is a visualization of a playability score.

DETAILED DESCRIPTION

Figure 1:
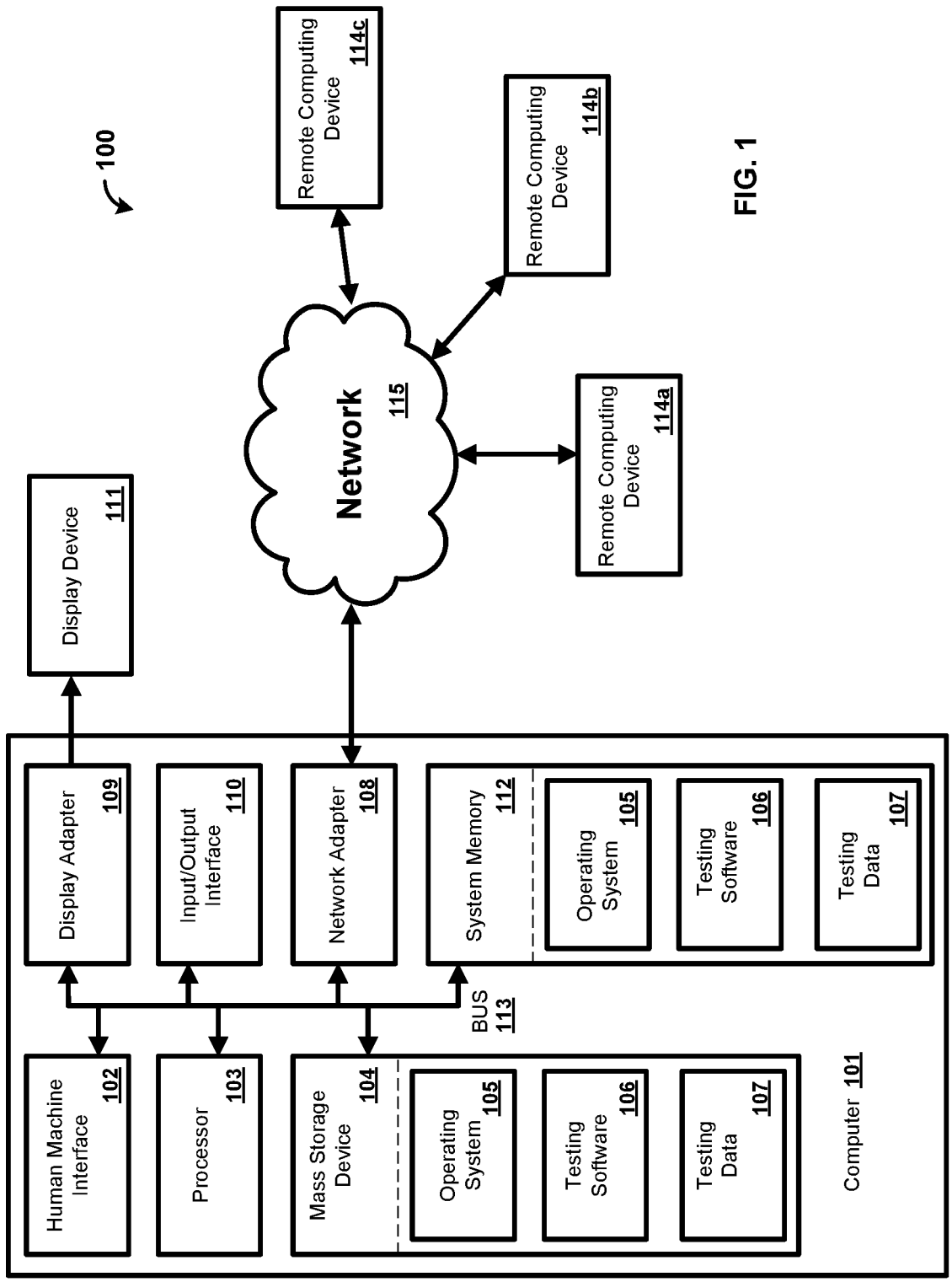
FIG. 1 is a block diagram of an example computing device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to determining a quantifiable playability score for fields (e.g., sports fields, surfaces or turf). The playability of a field, or sports surface, relates to the way in which objects and players interact with the surface. Various factors, including the surface hardness, stability, strength, moisture, composition, and other factors can affect the overall playability of a surface. Because of the number of factors and the way they interrelate, playability has traditionally been considered a subjective and non-quantifiable subject. This results in difficulties in objectively comparing the playability of one field to another, and in determining whether a field meets targeted goals.

To determine a quantifiable playability score for a field, various tests can be performed at multiple points on the field. For example, tests for g-max, head injury criterion (HIC), Advanced Artificial Athlete (AAA) (e.g., vertical deformation, force reduction and energy restitution), shear vane, rotational traction, and/or other tests can be performed at various test points on the field. The tests results can be compiled in a test data matrix, with a first dimension representing each type of test and a second dimension for each test site (e.g., a row for each test site, with a column value for each type of test). A centroid associated with the test data matrix can be determined. For example, a clustering algorithm can be applied to one or more rows of the test data matrix to determine a centroid in multidimensional space. One or more distances (e.g., from the one or more rows of the test data matrix) to the centroid can be determined. Based on the determined distances, a playability score can be determined. For example, the determined distances can be compared to a reference data set (e.g., determined distances for another field, targeted or "goal" values). The playability score can then be determined based on a statistical difference between the determined distances and the reference data set. These quantified playability scores can then be used to evaluate and compare one field to another, or to an arbitrary "ideal target," and to determine if a field meets goals for overall playability.

In an exemplary aspect, the methods and systems can be implemented on a computer 101 as illustrated in FIG. 1 and described below. Similarly, the methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors 103, a system memory 112, and a system bus 113 that couples various system components including the one or more processors 103 to the system memory 112. The system can utilize parallel computing.

The system bus 113 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the one or more processors 103, a mass storage device 104, an operating system 105, testing software 106, testing data 107, a network adapter 108, the system memory 112, an Input/Output Interface 110, a display adapter 109, a display device 111, and a human machine interface 102, can be contained within one or more remote computing devices 114*a,b,c* at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as the testing data 107 and/or program modules such as the operating system 105 and the testing software 106 that are immediately accessible to and/or are presently operated on by the one or more processors 103.

In another aspect, the computer 101 can also comprise other removable/non-removable, volatile/non-volatile computer storage media. By way of example, FIG. 1 illustrates the mass storage device 104 which can provide non-volatile storage of computer code, computer readable instructions, data structures, program modules, and other data for the computer 101. For example and not meant to be limiting, the mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, the operating system 105 and the testing software 106. Each of the operating system 105 and the testing software 106 (or some combination thereof) can comprise elements of the programming and the testing software 106. The testing data 107 can also be stored on the mass storage device 104. The testing data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 103 via the human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, the display device 111 can also be connected to the system bus 113 via an interface, such as the display adapter 109. It is contemplated that the computer 101 can have more than one display adapter 109 and the computer 101 can have more than one display device 111. For example, the display device 111 can be a monitor, an LCD (Liquid Crystal Display), or a projector. In addition to the display device 111, other output peripheral devices can comprise components such as speakers (not shown) and a printer (not shown) which can be connected to the computer 101 via the Input/Output Interface 110. Any step and/or result of the methods can be output in any form to an output device. Such output can be any form of visual representation, including, but not limited to, textual, graphical, animation, audio, tactile, and the like. The display device 111 and computer 101 can be part of one device, or separate devices.

The computer 101 can operate in a networked environment using logical connections to one or more remote computing devices 114*a,b,c*. By way of example, a remote computing device can be a personal computer, portable computer, smartphone, a server, a router, a network computer, a peer device or other common network node, and so on. Logical connections between the computer 101 and a remote computing device 114*a,b,c* can be made via a network 115, such as a local area network (LAN) and/or a general wide area network (WAN). Such network connections can be through the network adapter 108. The network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the one or more processors 103 of the computer. An implementation of the testing software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 2 is a flowchart 200 of an example method. Beginning with step 200 a test data matrix can be generated. The test data matrix can comprise a first dimension with each entry in the first dimension corresponding to a respective tested attribute. For example, each column of the test data matrix can correspond to a different attribute tested at a particular test site. The tested attributes can include, for example, an infill depth, g-max, head injury criterion (HIC), force reduction, vertical deformation, energy restitution, shear vane, rotational traction, moisture content, surface firmness, temperature, bounce and pace, strength to penetration, or other attribute as tested at the particular test site. The test data matrix can comprise a second dimension with each entry in the second dimension corresponding to a different test site. For example, given N tested attributes at M different test sites of a particular field over R repetitions per location, the test data matrix can comprise an (R*M)×N matrix. The particular test sites can vary based on a particular sport, division, material, or other aspect associated with the field. As the number of test sites M and/or the number of repetitions increases, the fidelity and precision of the resulting playability score increases.

Generating the test data matrix can also include generating additional entries for a particular dimension (e.g., the second dimension). For example, one or more additional rows can be generated. Generating the one or more additional rows can comprise generating the one or more additional rows as a function of one or more Cartesian cross products of the test data matrix. The one or more Cartesian cross products can include one or more random Cartesian cross products. The one or more additional rows can then be added to the test data matrix.

Next, at step 220, a sample set can be determined. For example, the sample set can comprise the entirety of the test data matrix (e.g., the test data matrix and any generated additional rows, if any) or a combination of test data matrices. As another example, the sample set can comprise a subset of the test data matrix. The sample set can comprise a random selection of one or more entries (e.g., one or more rows) from the test data matrix. The size of the random selection can comprise a predetermined number of selected entries, a percentage of the total number of rows of the matrix, or another size. Determining the sample set can include scaling each value in the sample set. Scaling the sample set can include determining a minimum value and maximum value for each tested attribute. The minimum value for each tested attribute can be scaled to 0, and the maximum value can be scaled to 1. Each value for each tested value can be scaled according to their percentage of their corresponding maximum value. For example, a value that is seventy-five percent of the maximum value for its tested attribute can be scaled to 0.75. By scaling the values, test result values of varying magnitudes can be more easily compared, e.g., comparing a g max value to an HIC value.

At step 230 a centroid associated with the test data matrix can be determined. For example, a centroid of the sample set can be determined. Determining the centroid can comprise applying one or more clustering algorithms to the sample set. The clustering algorithms can include a k-means clustering, a density-based spatial clustering of applications with noise (DBSCAN), a principal component analysis (PCA) clustering, and/or another clustering algorithm.

At step 240 a plurality of differences relative to the centroid can be determined. For example, assuming a sample set of M' rows of N columns, the centroid can comprise a point in N dimension space described as a 1×N matrix. Additionally, each row in the sample set can be described as a 1×N matrix. Thus, determining the plurality of differences can comprise determining M' differences for each row of the sample set relative to the centroid. Determining a distance for a given row to the centroid can comprise determining a cosine distance, a Euclidian distance, or another distance.

At step 250 a playability score can be determined for the field based on the determined plurality of distances. For example, the playability score can be determined as a function of a comparison to a reference data set. The reference data set can comprise, for example, one or more values associated with an "ideal" reference field, one or more industry standard values, or another value. For example, the playability score can be determined as a difference or deviation calculated as a function of t-testing or another statistical analysis.

Figure 3A:
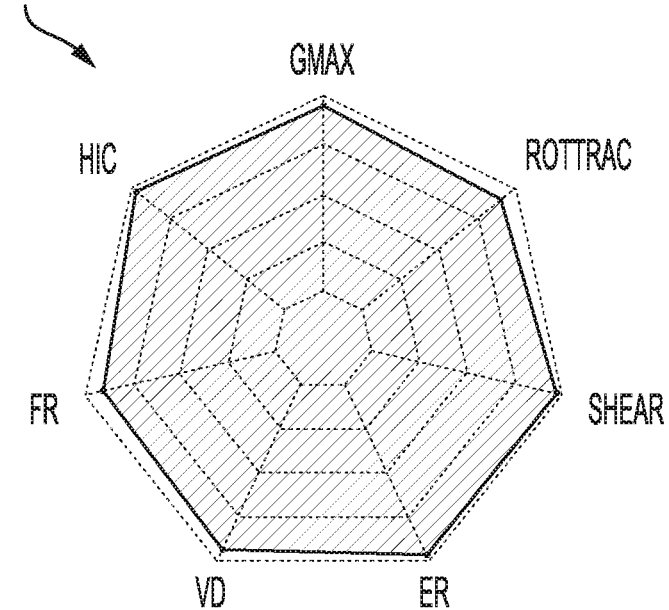
FIG. 3A is a visualization of a playability score.

FIG. 3A is a graphical representation 310 of playability for an example field. Assuming the following test values, a final playability score of 99 is achieved relative to a reference data set.

| Test | Actual | Scaled (Plot) | Final Score |
|---|---|---|---|
| Gmax | 99.94 | 0.95 | 99 |
| HIC | 618.88 | 0.97 | |
| Force Reduction | 56.42 | 0.90 | |
| Vertical Deformation | 6.45 | 0.93 | |
| Energy Restitution | 23.59 | 0.96 | |
| Shear Vane | 11.08 | 0.97 | |
| Rotational Traction | 38.15 | 0.91 | |

As shown in the graphical representation 310, the shaded area covers a majority of the total shape, representing that the tested values are statistically similar to the reference data set.

Figure 3B:
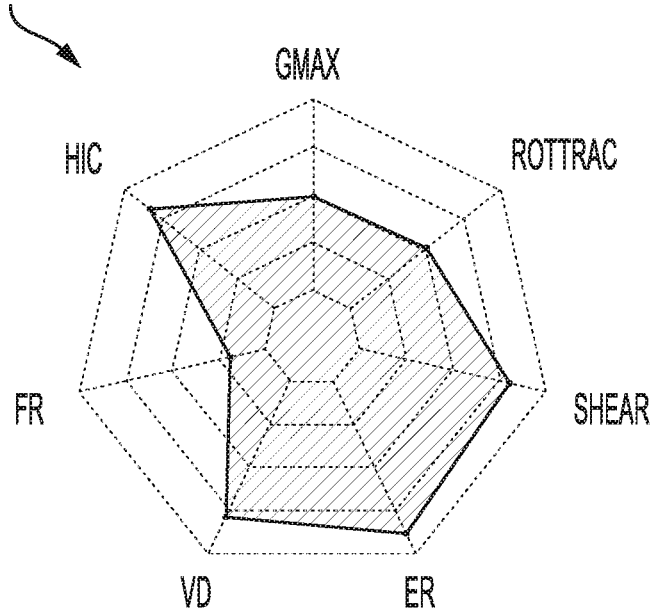
FIG. 3B is a visualization of a playability score.

FIG. 3B is a graphical representation 320 of playability for an example field. Assuming the following test values, a final playability score of 68 is achieved relative to a reference data set.

| Test | Actual | Scaled (Plot) | Final Score |
|---|---|---|---|
| Gmax | 77.18 | 0.49 | 68 |
| HIC | 489.32 | 0.84 | |
| Force Reduction | 45.18 | 0.20 | |
| Vertical Deformation | 5.29 | 0.79 | |
| Energy Restitution | 19.91 | 0.87 | |
| Shear Vane | 8.64 | 0.80 | |
| Rotational Traction | 30.07 | 0.50 | |

As shown in the graphical representation 320, the shaded area covers slightly over half of the total shape, representing an "okay" or moderately acceptable field relative to the reference data set.

FIG. 3C is a graphical representation 330 of playability for an example field. Assuming the following test values, a final playability score of 16 is achieved relative to a reference data set.

| Test | Actual | Scaled (Plot) | Final Score |
|---|---|---|---|
| Gmax | 55.38 | 0.06 | 16 |
| HIC | 357.56 | 0.71 | |
| Force Reduction | 42 | 0.0 | |
| Vertical Deformation | 3.87 | 0.61 | |
| Energy Restitution | 13.05 | 0.70 | |
| Shear Vane | 5.8 | 0.59 | |
| Rotational Traction | 21.57 | 0.08 | |

As shown in the graphical representation 330, the shaded area covers a fraction of the total shape, representing that the tested values are from a poor or unacceptable field relative to the reference data set.

Although the graphical representations 330 are shown as two-dimensional visualizations, it is understood that the playability score for a given field can be represented by any multidimensional representation.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   generating, by a computing device, a test data matrix comprising a first dimension and a second dimension, each first dimension entry in a plurality of first dimension entries corresponding to a respective tested attribute of a plurality of tested attributes associated with a playing surface, each second dimension entry in a plurality of second dimension entries corresponding to a respective test location of a plurality of test locations on the playing surface;
   determining, based on applying a clustering algorithm to at least a portion of the plurality of first dimension entries, a centroid associated with the test data matrix, wherein the centroid comprises a center of a multi-dimensional shape defined by the at least the portion of the plurality of first dimension entries;
   determining a plurality of distances relative to the centroid; and
   determining, based on a comparison of the plurality of distances to a reference data set, a playability score for the playing surface.

2. The method of claim 1, further comprising:
   generating, based on the test data matrix, one or more additional second dimension entries; and
   adding the one or more additional second dimension entries to the test data matrix.

3. The method of claim 2, wherein generating the one or more additional second dimension entries comprises generating, based on one or more Cartesian cross products, the one or more additional second dimension entries.

4. The method of claim 2, further comprising selecting, from the test data matrix, a subset of the plurality of second dimension entries.

5. The method of claim 4, wherein determining the centroid associated with the test data matrix further comprises determining the centroid relative to the subset of the plurality of second dimension entries.

6. The method of claim 4, wherein determining the plurality of distances comprises determining, for the subset of the plurality of second dimension entries, a corresponding distance to the centroid.

7. The method of claim 4, wherein determining the subset of the plurality of second dimension entries comprises performing a random selection of the plurality of second dimension entries.

8. The method of claim 1, wherein determining, based on applying the clustering algorithm to at least the portion of the plurality of first dimension entries, the centroid comprises determining the centroid based on one or more of: a k-means clustering, a density-based spatial clustering of applications with noise (DBSCAN), or a principal component analysis (PCA) clustering.

9. The method of claim 1, wherein determining the plurality of distances comprises determining a plurality of Euclidean distances or a plurality of cosine distances.

10. The method of claim 1, wherein the plurality of tested attributes associated with the playing surface comprise one or more of: a g-max, a head injury criterion (HIC), a vertical deformation, an energy restitution, a shear vane, or a rotational traction.

11. A system, comprising:
   at least one computing device configured to at least:
      generate a test data matrix comprising a first dimension and a second dimension, each first dimension entry in a plurality of first dimension entries corresponding to a respective tested attribute of a plurality of tested attributes associated with a playing surface, each second dimension entry in a plurality of second dimension entries corresponding to a respective test location of a plurality of test locations on the playing surface;
      determine, based on applying a clustering algorithm to at least a portion of the plurality of first dimension entries, a centroid associated with the test data matrix, wherein the centroid comprises a center of a multi-dimensional shape defined by the at least the portion of the plurality of first dimension entries;
      determine a plurality of distances relative to the centroid; and determine, based on a comparison of the plurality of distances to a reference data set, a playability score for the playing surface.

12. The system of claim 11, wherein the at least one computing device is further configured to at least:

generate, based on the test data matrix, one or more additional second dimension entries; and add the one or more additional second dimension entries to the test data matrix.

13. The system of claim 12, wherein generating the one or more additional second dimension entries comprises generating, based on one or more Cartesian cross products, the one or more additional second dimension entries.

14. The system of claim 12, wherein the at least one computing device is further configured to at least select, from the test data matrix, a subset of the plurality of second dimension entries.

15. The system of claim 14, wherein determining the centroid associated with the test data matrix further comprises determining the centroid relative to the subset of the plurality of second dimension entries.

16. The system of claim 14, wherein determining the plurality of distances comprises determining, for the subset of the plurality of second dimension entries, a corresponding distance to the centroid.

17. The system of claim 14, wherein determining the subset of the plurality of second dimension entries comprises performing a random selection of the plurality of second dimension entries.

18. The system of claim 11, wherein determining, based on applying the clustering algorithm to at least the portion of the plurality of first dimension entries, the centroid comprises determining the centroid based on one or more of: a k-means clustering, a density-based spatial clustering of applications with noise (DBSCAN), or a principal component analysis (PCA) clustering.

19. The system of claim 11, wherein determining the plurality of distances comprises determining a plurality of Euclidean distances or a plurality of cosine distances.

20. The system of claim 11, wherein the plurality of tested attributes associated with the playing surface comprise one or more of: a g-max, a head injury criterion (HIC), a vertical deformation, an energy restitution, a shear vane, or a rotational traction.

* * * * *